United States Patent [19]
Joyce et al.

[11] Patent Number: 6,099,898
[45] Date of Patent: Aug. 8, 2000

[54] METHOD FOR APPLYING POWDER PAINT

[75] Inventors: Jeffrey R. Joyce, Livonia; Jeffrey C. Johnson, Beverly Hills, both of Mich.

[73] Assignee: Haden, Inc., Auburn Hills, Mich.

[21] Appl. No.: 09/045,749

[22] Filed: Mar. 20, 1998

[51] Int. Cl.⁷ .................................. B05D 1/12; B05D 1/36
[52] U.S. Cl. ...................... 427/195; 427/203; 427/407.1; 427/424; 427/478; 427/479; 427/486
[58] Field of Search ..................................... 427/475, 477, 427/478, 479, 486, 195, 424, 203, 407.1; 118/312

[56] References Cited

U.S. PATENT DOCUMENTS

| | | |
|---|---|---|
| 4,044,175 | 8/1977 | Coxon et al. . |
| 4,193,777 | 3/1980 | de la Riviere . |
| 4,354,451 | 10/1982 | Vohringer et al. . |
| 4,373,820 | 2/1983 | Browning . |
| 4,376,136 | 3/1983 | Gernez . |
| 5,173,326 | 12/1992 | Kramer . |
| 5,690,995 | 11/1997 | Fischli et al. . |
| 5,747,106 | 5/1998 | Matsunaga . |
| 5,891,524 | 4/1999 | Erukulla . |

FOREIGN PATENT DOCUMENTS 2 613 640  4/1987  France .

*Primary Examiner*—Fred J. Parker
*Attorney, Agent, or Firm*—Niro, Scavone, Haller & Niro

[57] ABSTRACT

An apparatus and process for allowing a powder paint system to utilize reclaimed oversprayed powder paint of various colors by collecting it in a common reclaim collector system. The reclaimed powder paint is then applied to a work piece as a base coat to attain a portion of the total film build required. The remainder of the film thickness is then applied in subsequent application of virgin powder paint.

5 Claims, 2 Drawing Sheets

METHOD FOR APPLYING POWDER PAINT

BACKGROUND OF THE INVENTION

This invention is directed to an improved method and apparatus for the application of powder paint and the use of reclaimed oversprayed powder paint of various colors. More particularly, the present invention involves applying reclaimed powder paint to a work piece as a base or under coat to attain a portion of the total film thickness required. The invention finds advantageous application in the painting of, among other things, automobiles.

Automobile manufacturers have been utilizing powder paint for primer surface and anti-chip coatings because of the environmental benefits associated with powder paint. Powder paint systems have the added benefit of increased material utilization as compared to liquid paint systems because of their ability to capture and recycle oversprayed paint. This reuse of the oversprayed material, however, typically limits the system to one color of paint, or requires specific application and reclaim zones for each color, which is cost prohibitive compared to a liquid paint system.

Some automobile manufacturers utilize color liquid primer paint to reduce the required film thickness of the color top coat layer which is a more costly paint. By using a primer color that more closely matches the top coat color, the film thickness of the top coat can be reduced without compromising its color hiding performance. Also, if the primer paint color is similar to the top coat paint, a stone chip or scratch that penetrates through to the primer layer will not be as noticeable to the eye.

Because of the color change limitation, some auto manufacturers have not utilized powder paint for primer or anti-chip coatings. While system have been conceived to apply multiple colors of powder paint, they are not economical when compared to liquid paint systems.

One such multi-color powder paint system uses specific zones or booths for specific colors, thus isolating the colors geographically. This method has not proved successful because it is too costly due to the duplication of equipment for each color.

Another known method attempts to control the blending of the reclaimed paint into the various colors so as to minimize the color shift of each color. This method has at least two shortcomings. First, the final color is not a homogeneous film of one color, but a color similar to the specific color except the film contains speckles of the other specific colors mixed in with it. Second, the "similar" color that results will not be consistent but will shift as the product mix of the plant shifts. For example, if more white primers are needed over a given period, the reclaim mixture will be lightened and shift all the virgin/reclaim blends in that direction. Inconsistent primer colors will require a thicker top coat color film to hide this variation, thus contradicting the very reason for the color key prime system.

Accordingly, it is an object of the present invention to provide a method allowing a multi-color powder paint system to be space and cost competitive with a liquid paint system while retaining the environmental advantages and material utilization efficiency of a powder paint system.

It is another object of the invention to provide a method for applying multi-color powder paint to objects without having individual booths or zones for each color.

It is yet another object of the invention to provide a method for producing a final film surface on a powder painted object which has no cross-color contamination.

It is further object of the invention to provide a method for producing a final film surface of virgin powder paint with the associated reduced risk of dirt contamination.

SUMMARY OF THE INVENTION

The invention is generally directed to a method for applying multi-color powder paint to a work piece or article of manufacture, such as an automobile. This method utilizes all the reclaimed oversprayed paint of various colors by collecting it in a common reclaim collector system. The reclaimed powder is then applied to the articles as a first or under coat to attain a portion of the total film build required. The remainder of the film thickness is then applied as virgin powder paint over the reclaimed paint film. The virgin powder paint application equipment is fitted with color change capability to apply multiple colors from the same equipment. The final cured film will be the specific color of the virgin powder paint applied over the reclaimed powder paint. This method has three distinct advantages over other methods that blend reclaimed paint into the various colors: (1) the final film surface has no cross-color contamination; (2) the final film surface is virgin powder paint with the associated reduced risk of dirt contamination; and (3) all of the oversprayed powder paint is collected in a single paint reclaim system and is ultimately applied to the articles.

This invention is based on the following phenomena associated with powder paint. When powder paint is cured, the paint makes a transition through three primary stages. First, the powder melts into a liquid. Then, the liquefied paint flows out into a smooth continuous film. Finally, the paint film chemically cross-links or "cures" into a solid plastic film. When the paint melts and flows into a liquid film, there is very little mixing throughout the film thickness, due primarily to the viscosity of the liquid film. Particles of paint at the work piece surface deep within the film, for example, do not melt and flow to the outside surface of the film or vice-versa.

This characteristic is known and has been utilized in the automotive industry already in the application of black-out powder paint over uncured primer powder paint on portions of a vehicle. After the vehicle is baked, the black-out powder areas show no evidence that there is a different color of powder paint underneath even though the two films were co-baked. This is only possible if the two paint layers are substantially compatible in chemical make up, aside from pigmentation.

In the current invention, this characteristic of powder paint is utilized in that a base or under layer of mixed color reclaimed paint is applied before the top layer of virgin specific color paint is applied to assure that the final color is maintained while utilizing the oversprayed paint from the entire system to attain the total specified film thickness. This system is also applicable to automotive top coat systems that only use a small number of colors (perhaps 8 or less).

Other aspects and advantages of the present invention will become apparent from further disclosure of the preferred embodiment.

BRIEF DESCRIPTION OF THE DRAWING

The novel features which are characteristic of the present invention are set forth in the appended claims. The invention itself, however, together with further objects and attendant advantages, will be best understood by reference to the following description taken in connection with the accompanying drawings which are as follows:

DESCRIPTION OF THE PREFERRED EMBODIMENTS

Figure 1:
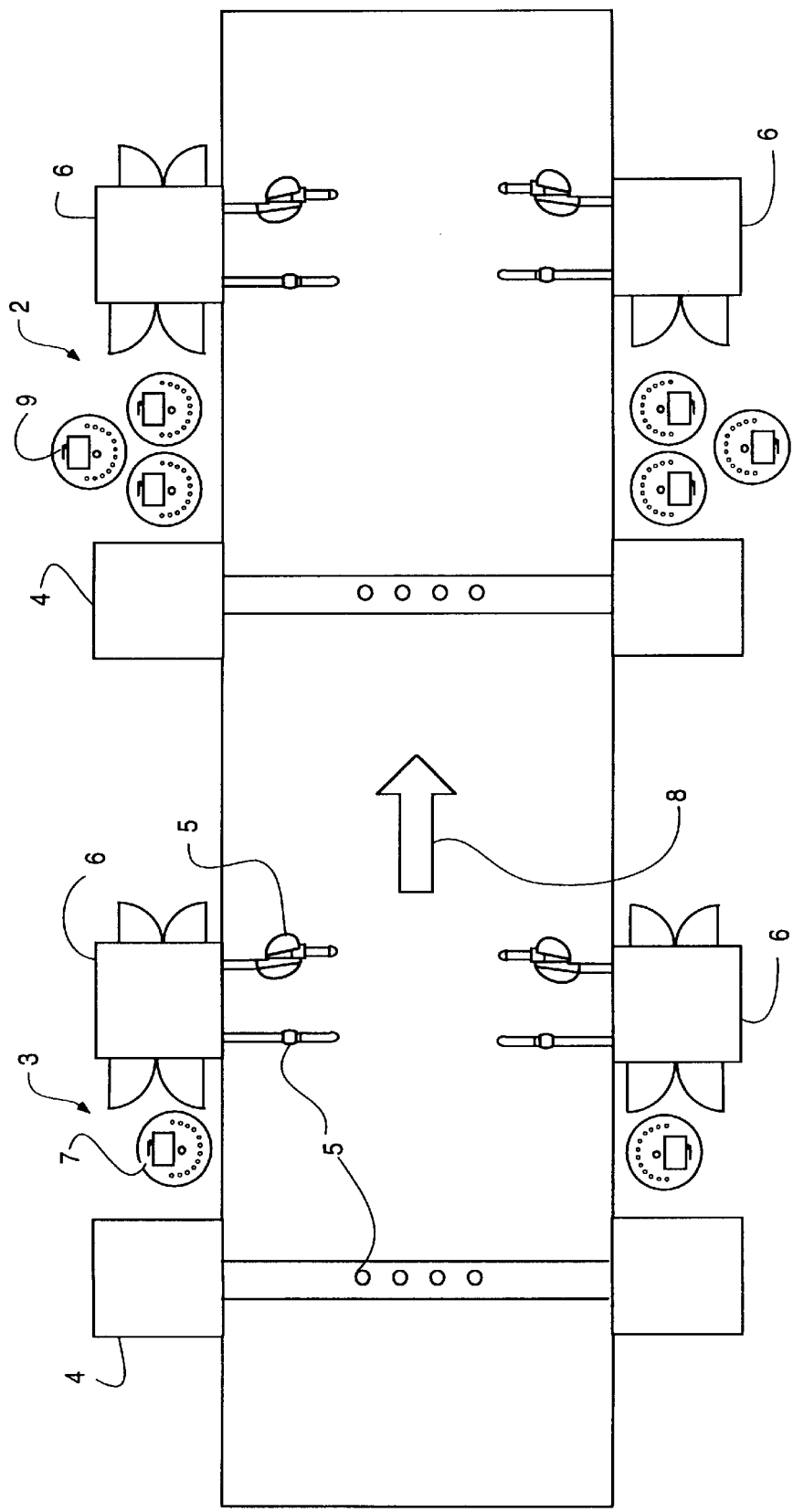
FIG. 1 is a schematic diagram illustrating one embodiment of the invention.

One embodiment of this invention is as follows: The powder paint spray booth 1 is divided into two specific zones 2 & 3. Both of the zones 2 & 3 are fitted with essentially the same (but not necessarily so) automatic paint application equipment. In the embodiment shown in FIG. 1, the reclaimed powder paint application zone 3 is equipped with an overhead machine 4 which has four powder paint applicators 5. The reclaimed powder paint application zone 3 also has two side machines 6 each having one or more of powder paint applicators 5. The reclaimed powder paint application zone 3 has a reclaim powder paint hopper 7 which stores reclaimed, powder paint from the powder paint spray booth 1 or elsewhere. The reclaimed powder paint in the hopper 7 is then applied using the powder paint applicators 5 to the work piece 8 as it is moved longitudinally through the reclaimed powder paint application zone 3 of the powder paint spray booth 1.

Similarly, the virgin powder paint application zone 2 is equipped with an overhead machine 4 which, in this embodiment, has four powder paint applicators 5. The virgin powder paint application zone 2 also has two side machines 6 each having one or more of powder paint applicators 5. The virgin powder paint application zone 2 has virgin powder paint hoppers 9 each of which stores a color-specific virgin powder paint. Virgin powder paint from one of the virgin powder paint hoppers 9 is then applied using the powder paint applicators 5 to the work piece 8 as it is moved longitudinally through the virgin powder paint application zone 2 of the powder paint spray booth 1.

Oversprayed powder paint from the virgin powder paint application zone 2 and the reclaimed powder paint application zone 3 is collected and transported to the reclaimed powder paint hopper 7. The reclaimed powder paint hopper 7 is connected to the overhead machine 4 and side machines 6 to provide the reclaimed powder paint to the powder paint applicators 5. The powder paint applicators 5 of the reclaimed powder paint application zone 3 spray the reclaimed powder paint onto the work piece 8 at a film thickness less than that of the total required film thickness. The virgin powder paint application zone 2 is utilized to apply only color specific virgin paint over the reclaimed powder paint film on the work piece 8 to bring the film to its full specified thickness and assure its color. The overhead 4 and side machines 6 of the virgin powder paint application zone 2 are capable of selecting a specific powder paint from the virgin powder paint powder hoppers 9, thereby changing the color of the powder paint that is applied in the virgin powder paint application zone 2.

Thus, all work pieces 8 will be painted in the reclaimed powder paint application zone 3 with reclaimed powder paint, and then painted in the virgin powder paint application zone 2 with virgin powder paint of a specific color required for the top coat for the work piece 8.

There can be a specific primer color for each top coat color (known as color specific primers), or more commonly, a primer color for a group of top coat colors (known as color keyed primers). It will be obvious to those skilled in the art to which this invention pertains that a similar system which practices this invention could also be implemented with manual application of powder.

Figure 2:
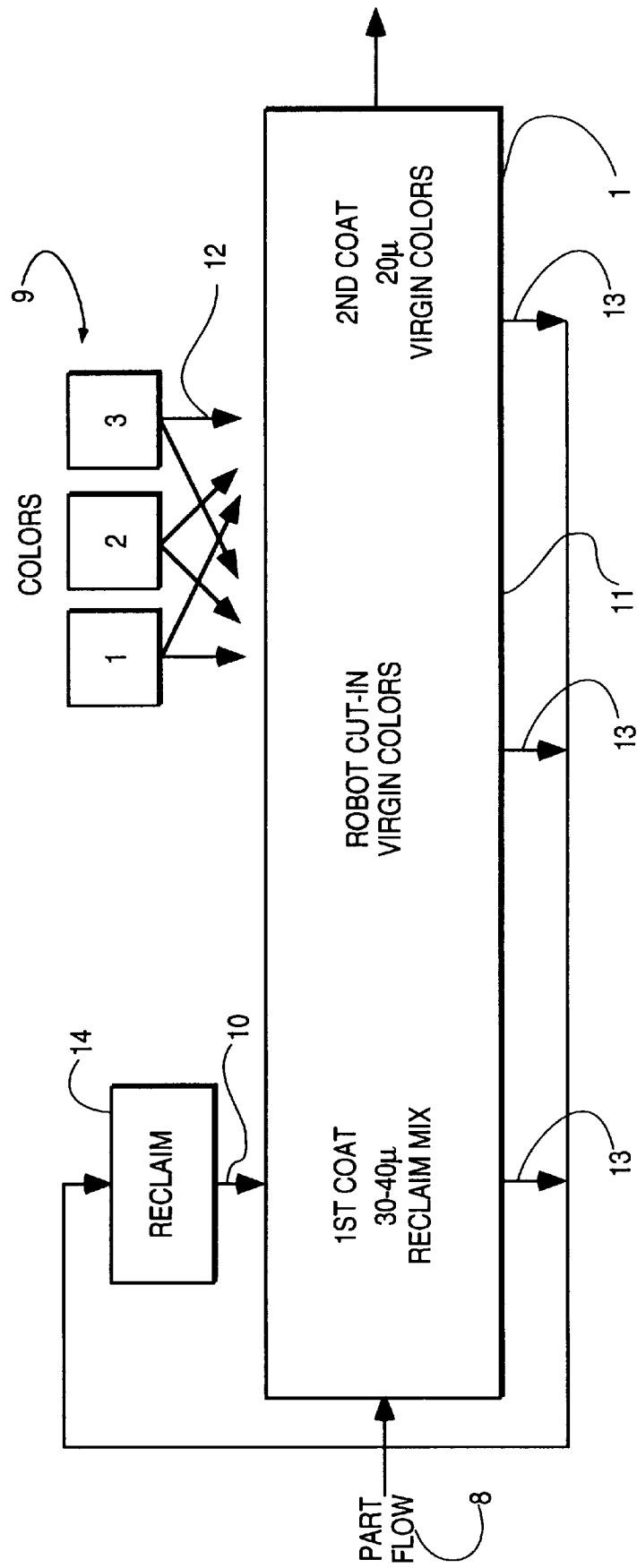
FIG. 2 is a top schematic diagram illustrating another embodiment of the invention.

Another embodiment of the invention is shown in FIG. 2. Similarly, a powder paint coat of a thickness (in this embodiment, between 30 and 40 microns) of less than the total required paint build is applied to the work piece 8 using reclaimed powder paint 10.

Once a powder paint coat of reclaimed powder paint 10 has been applied to the work piece 8, a second powder paint coat of a desired thickness (in this embodiment, approximately 20 microns) is applied over the reclaimed powder paint base coat to attain the total required paint film build. In this embodiment, this is done in two stages. First, in the "Robot Cut-In Virgin Colors" stage, one or more robotic machines 11 are used to apply virgin powder paint of a specific color 12 to certain inside surfaces of the work piece such as automobile door jambs. Then, the same virgin powder paint 12 is applied to the work piece 8 as the second powder paint coat over the outer surface of the work piece such as the body of an automobile. A plurality of virgin powder paint hoppers 9 can be used to allow selecting and changing of the color of the virgin powder paint applied to the work piece 8.

Oversprayed powder paint 13 is then collected in the reclaimed powder paint hopper 14 and used as the reclaimed powder paint 10.

From the foregoing, it will be appreciated that numerous variations and modifications may be implemented without departing from the true spirit and scope of the subject invention. It is understood that no limitation with respect to the specifically described method and apparatus is intended or should be inferred. Rather, the present examples and embodiments are to be considered in all respects as illustrative and not restrictive, and the invention is not to be limited to the details given here.

We claim:

1. A method of painting a series of articles comprising the steps of:

(a) applying at least one layer of powder paint containing reclaimed powder paint to one of the articles and collecting the powder paint not deposited on the article in a reclaim system;

(b) applying to the article an outer layer of color specific powder paint, having a color different from that of the powder paint containing reclaimed powder paint, the outer layer being applied over the at least one layer of step (a) without first heating the powder paint containing reclaimed powder paint of the at least one layer, and collecting the color specific powder paint not deposited on the article in the reclaim system; and (c) the collected powder paint in the reclaim system thereby providing a source for application of reclaimed powder paint on subsequent articles without cleaning the reclaim system when changing to a different color specific powder paint.

2. The method of claim 1 further comprising the step of applying a sufficient quantity of the color specific powder paint in step (b) to provide a specified color for the outer layer while applying a sufficient quantity of the powder paint containing reclaimed powder paint in step (a) to attain a pre-determined powder paint film thickness.

3. The method of claim 1 further comprising the step of applying a sufficient thickness of the outer layer of step (b) over the at least one layer of step to assure the color of the outer layer (a).

4. The method of claim 1 further comprising the step of applying the at least one layer of step (a) to a thickness such that substantially all of the powder paint reclaimed in steps (a) and (b) will be utilized.

5. The method of claim 1 further comprising the step of applying the outer layer of step (b) to a thickness such that a pre-determined powder paint film thickness is attained together with the at least one layer of step (a).

* * * * *

UNITED STATES PATENT AND TRADEMARK OFFICE
CERTIFICATE OF CORRECTION

PATENT NO. : 6,099,898
DATED : August 8, 2000
INVENTOR(S) : Jeffrey C. Joyce et al.

It is certified that error appears in the above-identified patent and that said Letters Patent is hereby corrected as shown below:

<u>Title page,</u>
Item [56], insert the following references:

-- 5,078,084    01/07/1992    Shutic, et al
5,153,028    10/06/1992    Shutic, et al
5,700,323    12/23/1997    Koch, et al
5,743,958    04/28/1998    Shutic --

<u>Column 6,</u>
Line 1, insert -- (a) -- after "step"
Line 2, delete "(a)"

Signed and Sealed this

Tenth Day of September, 2002

Attest:

JAMES E. ROGAN
Attesting Officer          Director of the United States Patent and Trademark Office